2,666,250

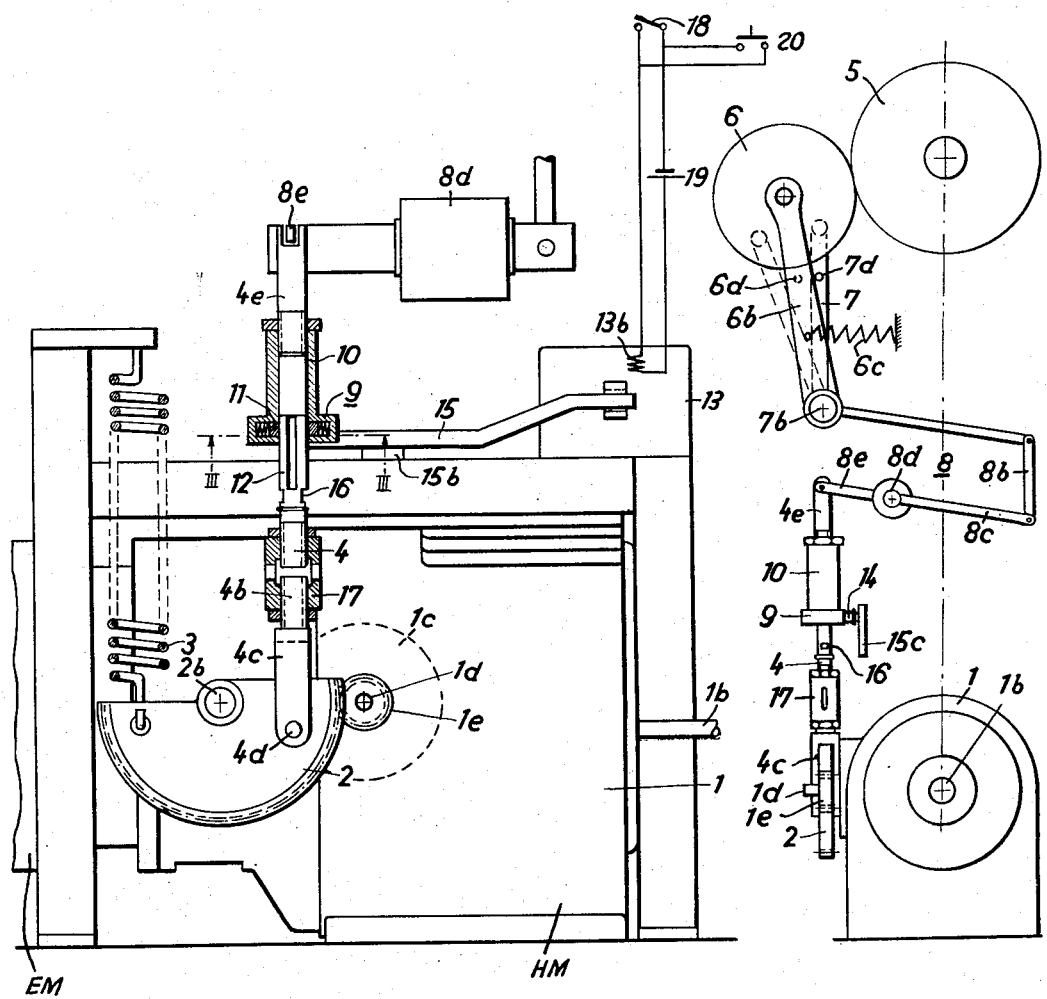
Jan. 19, 1954 — K. LIEBRANDT — 2,666,250
DRIVE CONTROL APPARATUS FOR BEAM WARPERS
Filed Oct. 10, 1951
INVENTOR:
KARL LIEBRANDT
BY C. M. Avery
ATT'Y Patented Jan. 19, 1954

UNITED STATES PATENT OFFICE 2,666,250

DRIVE CONTROL APPARATUS FOR BEAM WARPERS

Karl Liebrandt, Oberfranken, Germany

Application October 10, 1951, Serial No. 250,640

Claims priority, application Germany October 23, 1950

7 Claims. (Cl. 28—39)

My invention relates to control apparatus for liquid-driven beam warpers.

The application of a liquid drive or transmission to the beam of a warping machine has the advantage of facilitating the desired fine and stepless regulation of the warping speed. Such fluid devices must permit starting, stopping and speed regulating the driven beam by manual action of the operator as well as by means of an automatic control responsive to the warping or beaming operation. It is also necessary to provide for an automatic stopping of the warper in response to the drop wires or other thread-fault responsive devices of the machine, and it is often desired to permit a rapid stopping of the drive by means of a manually operable electric switch. Heretofore, these requirements could be satisfied only by means of rather intricate control devices.

It is, therefore, an object of my invention to provide a control apparatus for the liquid drive of beam warpers that affords the above-mentioned control performance with reliable means of utmost simplicity. Another object of my invention is to make the starting of the liquid warper drive dependent upon a preceding zero setting of the control apparatus so that in the event of stoppage, for instance due to thread break, the drive can resume its operation only by starting from zero speed, thus preventing an excessive tensioning or stretching of the thread by securing a slow building up of the beam speed.

According to my invention, I connect a displaceable control member, actuatable manually or in dependence upon warp beam operation, with the movable regulator member of the hydraulic warper drive by a mechanical transmission which includes a releasable coupling or clutch mechanism that must be clutched in for permitting the drive to be normally started, stopped or speed regulated by operation of the transmission. I further connect the releasing means of the clutch mechanism with the fault-responsive safety devices, such as the drop wires, of the driven warper so that the clutch will automatically fall out upon occurrence of thread break or other fault, then causing the regulator member to shut off the drive, the regulator member being biased, preferably by a spring, to move the shut-off or zero-speed position whenever the clutch mechanism is released.

According to another feature of the invention the clutch mechanism is so arranged and designed that after each release a recoupling, and hence an operation of the regulating member of the hydraulic drive, is possible only after the hydraulic drive is reset to its stop position.

According to still another feature of the invention the above-mentioned clutch mechanism comprises a sleeve in a control rod and is longitudinally movable but normally arrested by latching means. Preferably the latching means have a pair of spring-biased claws pivotally mounted on the sleeve and engageable with a recess of the control rod, a release pin being provided to permit opening the claw members from the outside of the clutch sleeve. The release pin is controlled through an electromagnet by the thread-fault responsive devices of the machine or by means of an electric switch.

The foregoing and more specific objects and features of the invention will be apparent from the following description of the embodiment exemplified by the drawing in which:

Fig. 1 shows the regulator end of a hydraulic warper drive partly in section;

Fig. 2 shows schematically a side view of the same device in conjunction with the warp beam driven thereby;

Fig. 3 shows a bottom view of part of an appropriate coupling device, the viewing plane being indicated in Fig. 1 by a dot-and-dash line denoted by III—III; and Fig. 4 is a schematic diagram of the hydraulic drive means of the same machine.

The warp beam 5 of the illustrated machine is driven by a liquid drive 1. The drive has a hydraulic motor HM whose output shaft 1b supplies the driving power for the warp beam. The hydraulic motor HM is driven by fluid flow from a pump 1c operated by suitable means such as EM. The delivery of the pump and hence the speed of the hydraulic-motor shaft 1b depends upon the rotary setting of a pump control shaft 1d. The control shaft 1d has a pinion 1e meshing with a spur gear segment 2 revolvable about a stationary pin 2b. In Fig. 1 the segment 2 is illustrated in the shut-off position in which the pump is not effective so that the warper beam is stopped. In Fig. 2 the segment 2 is shown in the full-speed position. A spring 3 biases the segment 2 to the shut-off position. An axially displaceable control rod structure 4 is pivotally linked to the segment 2 for moving it in opposition to the biasing spring 3. The rod structure 4 has two separate threaded portions joined by a differentially threaded connecting sleeve 17 which permits lengthening or shortening the rod structure to the correct length. The lower portion 4b of the rod structure is joined with a U- shaped bracket 4c whose legs straddle the segment and are pivotally linked therewith by a pin 4d. The top portion 4e of the rod structure engages a linkage 8 actuable by means of a control member 7. Member 7 is essentially a bell crank lever, pivoted at 7b, and is joined by a connecting link 8b with an arm 8c whose shaft is pivoted at 8d and rigidly joined with an arm 8e engaged by the rod portion 4e. Control member 7 can be moved between the right-hand position shown partly in full lines and the left-hand position shown wholly in broken lines, the latter position corresponding to the shut-off position of segment 2 shown in Fig. 1.

Movement is imparted to the lever 7 either manually or in dependence upon the operation of the section beam 5. To this end a pressure roller 6 is provided which acts upon the lever 7 and the linkage 8 to lift or lower the control rod structure 4. The roller 6 is journalled on an arm 6b which is angularly movable about the pivot 7b and is biased by a spring 6c toward the section beam 5. The roller 6, engaging the warp material being wound onto the beam, changes its position relative to the beam shaft as the wound-up material on the beam changes its diameter. The manually operable lever 7 can be coupled with the arm 6b of roller 6 by means of a releasable and spring-biased catch pin 7d which may be placed into engagement with a hole 6d in lever 6b. When lever 7 and arm 6b are thus coupled with each other, the speed control of the hydraulic drive is automatic and dependent upon the build-up of material on the beam so as to regulate for constant linear winding speed.

The above-described transmission between the control lever 7 and the spring-biased regulator adjusting member (segment) 2, includes a clutch mechanism 9 which forms part of the control rod structure and comprises a sleeve 10 and a pair of latch claws 11. The claws 11 are disposed in an enlarged portion of the sleeve where they are pivoted at 11b and biased by respective springs 11c. The top portion 4e of the rod structure is screwed into the sleeve 10 to be rigidly joined therewith. Another portion 12 of the rod structure is axially slidable in the sleeve 10. When rod portion 12 is in its uppermost position relative to sleeve 10, the claws 11 catch into respective grooves 16 of portion 12 thus latching it in the clutched position. The gear segment 2 of the fluid drive can then be actuated under control by the sectional warper beam 5 or by the manual lever 7 through the clutch 9.

The clutch 9 may be released automatically by a control magnet 13 under control by the drop wires or other thread-fault responsive safety devices of the warper. To this end, a slidable release pin 14 traverses the sleeve 10 and has a conical or wedge-shaped end entering between the two claws 11. The release pin 14 is biased by a spring 14b to normally remain in the position shown in Fig. 3. A transmission lever 15 extending between the magnet 13 and the release pin 14 is pivoted at 15b and has one end linked to the magnet while the other end carries a plate 15c slidably engageable by the release pin 14. When magnet 13 is energized, the end plate 15c is moved against the release pin 14 and forces it in opposition to spring 14b toward the claws 11. As a result, the claws are spread apart and out of engagement with grooves 16 of the rod portion 12 so that the clutch is opened. Then the segment 2, under the bias of its spring 3, is free to return to the zero-speed position shown in Fig. 1. The end plate 15c of lever 15 extends along the control rod structure a sufficient distance to perform the just-mentioned release operation in any position of the control rod structure and hence regardless of the particular beaming speed to which the warper may be adjusted.

As mentioned, the described release operation is controlled by the thread-fault responsive drop wires or the like stop-motion devices of the warper. Only one of such drop wires is schematically shown at 18, the others being parallel connected with drop wire 18 to the coil 13b of magnet 13 so as to energize it from a current source schematically shown at 19. Breakage or excessive lengthening of a thread running into the beam 5 causes the appropriate drop wire to close the circuit thus initiating the described releasing performance. A manually operable stop switch 20, also parallel connected to drop wire 18, permits the operator to stop the warper drive at will.

The illustrated arrangement and design of the clutch 9 is such that, after an automatic release, it can be placed into clutching condition only when the sleeve 10 is moved downwardly to a position in which the claws 11 can again catch into the grooves 16. Since this position corresponds to the zero-speed adjustment of the fluid drive, the warping machine can be started and again be brought up to speed only when the hand lever or the beam responsive regulating devices are first brought to the stop position. This secures a gradual acceleration of the beam after each stoppage.

It will be recognized that, aside from a simple and predominately mechanical design, a control apparatus according to the invention has the advantage that it causes an automatic stopping of the fluid drive pump, for instance in response to thread breakage, and thereafter always secures a gradual building up of the warping speed by requiring the operator to first reset the regulator to zero before restarting the machine, thus preventing excessive tensioning or stretching of the material being beamed.

It will be understood by those skilled in the art that my invention permits of various modifications and may be embodied in designs other than that specifically illustrated and described, without departing from the invention and within the scope of the claims annexed thereto.

I claim:

1. In a beam warper having a warp beam, a hydraulic drive having a hydraulic motor connected with said beam for driving the beam and having a controllable pump connected with said motor for operating said motor, said pump having a regulator member movable from a zero-speed position through a given range for controlling the beaming speed, the combination of control apparatus comprising a manually displaceable control member, means disposed between said control member and said beam for also displacing said control member in dependence upon the beaming operation, a transmission connecting said control member with said regulator member and including a releasable clutch for transmitting motion from said control member to said regulator member, and thread-fault responsive means connected with said clutch for releasing said clutch.

2. In a beam warper having a warp beam, a hydraulic drive having a hydraulic motor connected with said beam for driving the beam and having a controllable pump connected with said motor for operating said motor, said pump having a regulator member movable from a zero-speed position through a given range for controlling the beaming speed, the combination of control apparatus comprising biasing means urging said regulator member to said zero-speed position, a displaceable control member, a transmission joining said two members and comprising releasable clutch means for transmitting motion from said control member to said regulator member, and thread-fault responsive means connected with said clutch means for releasing said clutch means to permit said biasing means to reset said regulator member to said position upon occurrence of fault in the thread being beamed.

3. In control apparatus according to claim 2, said clutch means comprising two parts linked with said regulator member and with said control member respectively, said two parts being displaceable relative to each other in the force transmitting direction of said transmission and being latchingly engageable with each other in one fixed relative position whereby, upon release of said clutch means, said control member must be reset to stop position for latching said clutch means to restart the drive.

4. In control apparatus according to claim 2, said clutch means comprising a sleeve linked to one of said members and a rod linked to said other member, said rod being axially slidable in said sleeve, a latch means movably mounted on said sleeve and having a spring bias urging said latch means into sliding engagement with said rod, said latch means being latchingly engageable with said rod only in a fixed position of said rod relative to said sleeve in which position, upon preceding release of said claws from said rod, said control member is in drive stopping position.

5. In control apparatus according to claim 2, said clutch means comprising a sleeve linked to one of said members and a rod linked to said other member, and axially slidable in said sleeve, two latch claws pivoted on said sleeve and jointly straddling said rod, spring means connected with said claws to bias them toward said rod, said claws being latchingly engageable with said rod in a fixed position of said rod relative to said sleeve in which position, upon preceding release of said claws from said rod, said control member is in drive stopping position, and a release pin slidably traversing said sleeve and engageable with said two claws, said pin being actuable from the outside of said sleeve for unlatching said claws from said rod.

6. In control apparatus according to claim 2, said clutch means comprising two parts linked with said regulator member and with said control member respectively, said two parts being displaceable relative to each other in the force transmitting direction of said transmission, latch means movably mounted on one of said parts and having a spring bias toward said other part, said latch means being latchingly engageable with said other part in a given mutual position of said two parts in which position, after release of said latch means, said control member is in zero-speed position, a movable release element engageable with said latch means for releasing it from latching engagement, and electromagnet means mechanically connected with said release element and forming part of said fault-responsive means to release said member in response to thread fault.

7. In a beam warper having a warp beam, a hydraulic drive having a hydraulic motor connected with said beam for driving the beam and having a controllable pump connected with said motor for operating said motor, said pump having a regulator member movable from a zero-speed position through a given range for controlling the beaming speed, the combination of control apparatus comprising a manually displaceable control means, an automatically displaceable control means responsive to beam build-up, a transmission joined with said regulator member and selectively operable from one of said respective control means, said transmission comprising a releasable clutch means for transmitting motion from said one control means to said regulator member, and thread-fault responsive means connected with said clutch means for releasing said clutch means to reset said regulator member to said zero-speed.

KARL LIEBRANDT.

References Cited in the file of this patent
UNITED STATES PATENTS

| Number | Name | Date |
|---|---|---|
| 2,190,529 | Bretschneider | Feb. 13, 1940 |
| 2,195,829 | Shreffler | Apr. 2, 1940 |
| 2,253,454 | Voit | Aug. 19, 1941 |
| 2,356,365 | Wiggermann | Aug. 22, 1944 |
| 2,373,462 | Crow | Apr. 10, 1945 |
| 2,398,265 | Tyler | Apr. 9, 1946 |
| 2,569,442 | Anderson | Oct. 2, 1951 |